F. S. STOUGHTON.
APPARATUS FOR CUTTING METAL STRIPS.
APPLICATION FILED AUG. 16, 1916.
1,256,608.
Patented Feb. 19, 1918.
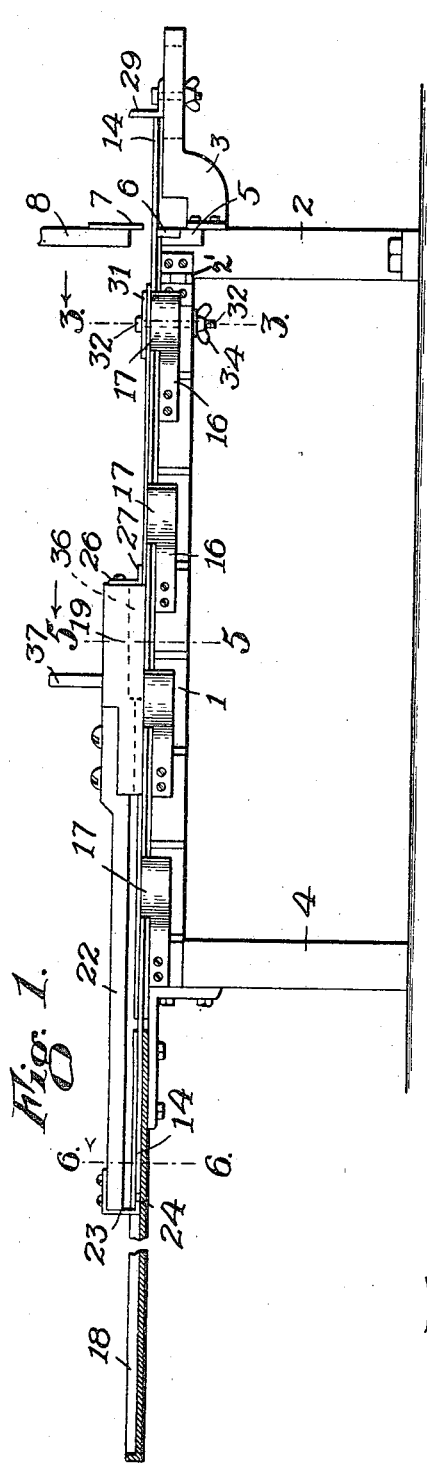
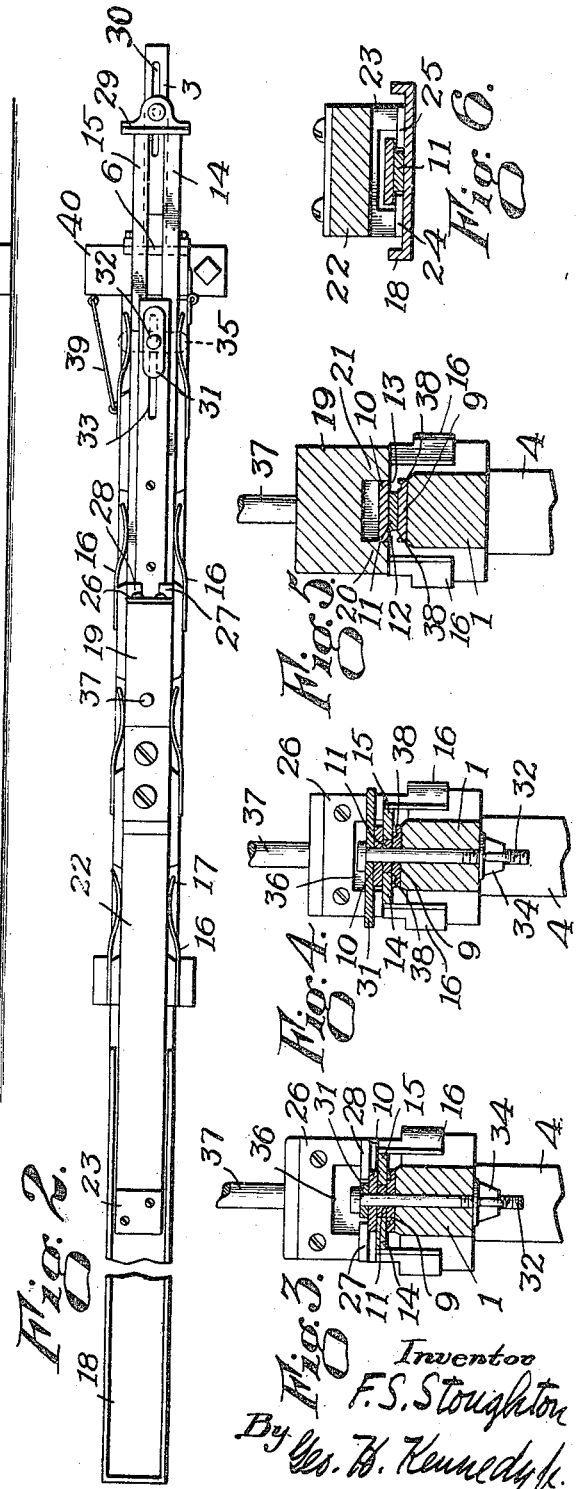

UNITED STATES PATENT OFFICE.

FREDERICK S. STOUGHTON, OF WORCESTER, MASSACHUSETTS.

APPARATUS FOR CUTTING METAL STRIPS.

1,256,608.  Specification of Letters Patent.  Patented Feb. 19, 1918.

Application filed August 16, 1916. Serial No. 115,327.

*To all whom it may concern:*

Be it known that I, FREDERICK S. STOUGHTON, a citizen of the United States, residing at Worcester, in the county of Worcester and Commonwealth of Massachusetts, have invented a new and useful Improvement in an Apparatus for Cutting Metal Strips, of which the following, together with the accompanying drawings, is a specification.

My present invention relates to an apparatus for cutting narrow metal strips, such as band iron, wire and the like, into pieces of a predetermined length, adapted for various purposes.

In the following specification and accompanying drawings I have described and shown an apparatus embodying my invention, the novel features being pointed out in the appended claims.

Referring to the accompanying drawings,

Figure 1 represents a side elevation of my improved apparatus.

Fig. 2 is a plan view.

Fig. 3 is a sectional view, on a larger scale, on the plane of the broken line 3—3, Fig. 1, showing the position of the pusher for long pieces.

Fig. 4 is a sectional view on the plane of the broken line 3—3, Fig. 1, but showing the position of the pusher for short pieces.

Fig. 5 is a transverse sectional view on the plane of the broken line 5—5, Fig. 1, with pieces to be cut removed.

Fig. 6 is a section on the plane of the broken line 6—6, Fig. 1.

Similar reference characters refer to similar parts in the different figures.

Referring to the accompanying drawings, 1 denotes a longitudinal bar or table upon which the strips to be cut are supported. One end of the bar 1 is connected by a hinge 2' with a leg 2 supporting a rigid framework 3, and the opposite end of the bar 1 is supported upon a movable leg 4. To the leg 2 is attached a plate 5 in which a stationary shear blade 6 is supported, coöperating with a vertically reciprocating shear blade 7 to sever the strips. The shear blade 7 is carried upon a vertically reciprocating framework 8, actuated by suitable operative mechanism, not shown.

Upon the bar 1, which is preferably made of wood, are mounted the metal plates 9 and 10, separated by a narrow strip 11, forming grooves 12 and 13, Fig. 5, on opposite sides of the strip 11, in which two strips of band iron 14 and 15 to be cut are inserted. Attached to the opposite sides of the bar 1 are blade springs 16, 16, having their free ends curved and extending upwardly at 17 to overlap the edges of the band iron 14 and 15 and press the latter against the separating strip 11. The bar 1 may be cut away opposite the curved sections 17 of the springs to allow them to approach the metal plates 9 and 10. The use of the yielding springs 16 permits band iron of different widths to be inserted. The pressure of the springs, which are arranged at frequent intervals along the bar 1, hold the inner edges of the band iron 14 and 15 firmly against the separating strip 11.

Attached to the bar 1 is a shallow trough 18, forming an extension in order to support pieces too long to be suitably supported by the bar 1. The bottom of the trough 18 is in alinement with the grooves 12 and 13. Slidably supported upon the upper plate 10 is a block 19, preferably of wood and provided at its lower edge with ribs 20, 21, which overlap the edges of the plate 10 and serve to guide the block as it is moved along upon the plate 10. Extending from the block 19 is a bar 22, having at its rear end a lug 23 which reaches the bottom of the trough 18 and is provided with a pair of inwardly turned toes 24, 25 adapted to enter the grooves 12 and 13. Attached to the front end of the block 19 is a plate 26, projecting below the block 19 and having at its lower edge a pair of inwardly turned toes 27, 28, similar to the toes 23, 24, adapted to slide upon the top of the plate 10, or to be entered into and slide in the grooves 12 and 13.

Mounted upon the framework 3 is a stop 29 which is adjustable along a slot 30 toward or away from the cutting blade 6, in order to determine the length of the pieces to be cut. At the rear of the stationary cutting blade 6 a narrow stop-plate 31 rests upon the upper plate 10 and is pivoted upon a bolt 32 held in a slot 33, which enables the stop-plate 31 to be adjusted toward or away from the blade 6 and to be clamped against the plate 10 by means of the bolt 32 and a wing nut 34 beneath the bar 1. When the stop-plate 31 is turned upon the bolt 32, transversely to the plate 10, as shown by broken lines 35, Fig. 2, it projects into the path of the block 19 and serves as a stop to limit the approach of the block 19 toward the cutting blade 6. By rocking the stop-plate 31 to bring it longitudinally of the plate 10 in the position shown by full lines in Fig. 2, the stop-plate will pass through a groove 36 in the underside of the block 19, allowing the block 19 to approach the cutting blades.

The adjustable stop 29 determines the length of the pieces to be cut and the stop-plate 31 is set at the same distance from the cutting blade 6 as the stop 29, and it is used to limit the sliding movement of the pusher block 19 when the pieces to be cut are too long for a single length, but are too short for two lengths; when this happens, the stop-plate is turned transversely to the movement of the block 19, which limits the movement of the block the proper distance from the blade 6 to form one length.

In order to adapt the apparatus to cutting round pieces, such as rods or wire, instead of band iron, I provide the lower plate 9 with grooves 38, 38.

The operation of the apparatus is as follows:—Assuming the pieces to be cut are narrow strips of band iron, as shown at 14 and 15, they are inserted endwise in the grooves 12 and 13, with their outer edges against the upward extensions 17 of the springs 16, and with that portion of the strips which are too long for the bar 1 resting in the trough 18. The block 19 is then placed upon the plate 10, with the inwardly turned toes 27, 28 resting upon the top of the plate and with the lug 23 entering the trough 18, with the inwardly turned toes 24, 25 bearing against the ends of the pieces to be cut. The block 19 is then moved by the handle 37 along the top of the plate 10 with an intermittent movement alternating with the movement of the blade 7, and being held in position by the ribs 20, 21. When the block 19 has reached the end of the bar 1, the inwardly turned toes 24, 25 of the lug 23 will have entered into the grooves 12 and 13 for a short distance. The block 19 is then moved back and the toes 27 and 28 of the plate 26 are entered into the grooves 12 and 13 and the block 19 again moved forward and the cutting repeated. The recess 36 in the under side of the block 19 allows the block to be lowered sufficiently to bring the toes 27 and 28 from the position shown in Figs. 1 and 4 to the plane of the grooves 12 and 13. The hinged bar 1 is held in alinement with the cutting blades 6 and 7 by means of a hook 39, which connects the bar 1 with an extension 40 projecting from the top of the leg 2. By releasing the hook 39 the bar 1 may be swung around in order to clear the space in front of the cutting blades and permit their use for other purposes.

I claim,

1. In an apparatus of the class described, a rigid framework, a cutting mechanism, a bar hinged to said framework and provided with a guideway for the metal to be cut in alinement with said cutting mechanism, a trough for the metal to be cut forming an extension to said bar, a block movable along said bar and provided with a rearward extension, and a lug carried by said extension projecting into said trough to engage the metal to be cut.

2. In an apparatus of the class described, a rigid framework, a cutting mechanism, a bar provided with groove forming guideways for the metal to be cut, a trough forming an extension of said bar, a block slidable along said bar having a rearward extension projecting over said trough, and a lug carried by said extension provided with a rigid pair of inwardly turned toes adapted to enter said grooves.

3. In an apparatus of the class described, a framework, a cutting mechanism, a bar in alinement with the cutting mechanism, a pair of separated grooves open on their outer sides, a series of blade springs attached to the opposite sides of said bar with their free ends extending upwardly and across said grooves, a slidable block resting on said bar and provided on its under side with longitudinal ribs forming guides for said block, and a pair of inwardly turned toes carried by said block and adapted to slide in the open sides of said grooves.

4. In an apparatus of the class described, a framework, a cutting mechanism, an adjustable stop supported by said framework in front of said cutting mechanism, a bar provided with groove forming guideways for the metal to be cut, an adjustable stop supported by said bar at the rear of said cutting mechanism, and means for advancing the metal to be cut through said guideways toward said cutting mechanism.

5. In an apparatus of the class described, a rigid framework, a cutting mechanism, a bar provided with a pair of groove forming guideways for the metal to be cut, a trough forming an extension to said guideways, and means movable along said trough for pushing the metal to be cut toward said cutting mechanism, said pushing means having a pair of inwardly turned toes adapted to enter said guideways.

6. In an apparatus of the class described, a rigid framework, a cutting mechanism, a bar provided with a guideway for the metal to be cut, pushing means for advancing the metal along said guideway provided with a recess on its under side, and a stop plate pivotally held above said guideway adapted to be placed transversely to said guideway and be interposed in the path of said pushing means and when placed longitudinally to said guideway to enter the recess in said pushing means.

7. In an apparatus of the class described, a rigid framework, a cutting mechanism mounted thereon, a bar provided with guideways having a hinged connection at one end to said framework and provided at its opposite end with a supporting leg movable with said bar, detachable means for holding said bar in fixed relation to said framework, the pintle of said hinged connection being placed at one side of said bar, whereby the bar is capable of being swung to one side to clear the space in front of said cutting mechanism.

8. In an apparatus of the class described, a rigid framework, a bar provided with guideways for the metal to be cut, said bar having a hinged connection with said framework, with the pintle of the hinged connection placed at one side of said bar, whereby the bar is capable of being swung to clear the space in front of said framework.

9. In an apparatus of the class described, a framework, a cutting mechanism supported by said framework, a bar provided with a groove forming a guide for the metal to be cut, a trough forming a rearward extension to said bar, a block slidable on said bar, a rearward extension to said block, pushing means carried by the rear end of said extension for moving the metal toward the cutting mechanism, and similar pushing means carried by the front end of said block, said block being recessed to allow said second pushing means to be entered in the groove of said bar.

FREDERICK S. STOUGHTON.

Witnesses:
NELLIE WHALEN,
GEO. H. KENNEDY, Jr.

Copies of this patent may be obtained for five cents each, by addressing the "Commissioner of Patents, Washington, D. C."